United States Patent
Murayama et al.

(10) Patent No.: US 6,759,119 B2
(45) Date of Patent: Jul. 6, 2004

(54) MAGNETIC RECORDING MEDIUM

(75) Inventors: Yuichiro Murayama, Odawara (JP); Hiroshi Hashimoto, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 47 days.

(21) Appl. No.: 10/151,176

(22) Filed: May 21, 2002

(65) Prior Publication Data

US 2003/0064252 A1 Apr. 3, 2003

(30) Foreign Application Priority Data

May 22, 2001 (JP) ........................................ 2001-152785

(51) Int. Cl.$^7$ .............................................. G11B 5/738
(52) U.S. Cl. ...................... 428/323; 428/336; 428/522; 428/694 BC; 428/694 BS
(58) Field of Search ................................. 428/336, 522, 428/694 BC, 694 BS, 323

(56) References Cited

U.S. PATENT DOCUMENTS 4,596,747 A * 6/1986 Nishimatsu et al. .. 428/694 BC
4,746,558 A * 5/1988 Shimozawa et al. ......... 428/141
6,472,063 B1 * 10/2002 Watase ....................... 428/336
6,607,824 B2 * 8/2003 Horai et al. ................. 428/336

* cited by examiner

*Primary Examiner*—Stevan A. Resan
(74) *Attorney, Agent, or Firm*—Sughrue Mion, PLLC

(57) ABSTRACT

Provided is a magnetic recording medium having excellent coating film smoothness, electromagnetic characteristics and running durability. A magnetic recording medium comprises a nonmagnetic layer comprising a nonmagnetic powder and a binder and at least one magnetic layer comprising a magnetic material and a binder in this order. The magnetic material is an acicular ferromagnetic material having a major axis length ranging from 20 to 100 nm, the nonmagnetic layer and at least a magnetic layer adjacent to the nonmagnetic layer are obtained by simultaneously multi-layer coating a nonmagnetic layer coating liquid and a magnetic layer coating liquid and exposing to radiation. The binder comprised in the nonmagnetic layer coating liquid comprises a vinyl chloride copolymer having a molecular weight ranging from 10,000 to 100,000 and a radiation-curing functional group. The magnetic layer coating liquid does not comprise a binder component having a radiation-curing functional group. The nonmagnetic layer coating liquid and/or said magnetic layer coating liquid comprise a compound having a molecular weight ranging from 200 to 2000 and a radiation-curing functional group with two or more functions. The magnetic layer adjacent to the nonmagnetic layer has a thickness equal to or less than 0.5 $\mu$m.

13 Claims, No Drawings

MAGNETIC RECORDING MEDIUM

FIELD OF THE INVENTION

The present invention relates to a magnetic recording medium excellent in coating film smoothness, electromagnetic characteristics and running durability.

RELATED ART

Magnetic recording media are widely employed in recording tapes, videotapes, computer tapes, disks, and the like. Magnetic recording media are becoming denser and the recording wavelengths are becoming shorter each year. There is also an examination underway as to whether the recording method is changed from analog to digital.

With the high densification of magnetic recording media, a demand for greater coating film smoothness has come and magnetic materials tend to be in the form of microparticles. Kneading technology is being employed to exert great shearing force on magnetic and nonmagnetic materials to achieve a high degree of dispersion. In particular, since microgranular ferromagnetic material with a major axis length equal to or less than 100 nm tends to aggregate, adequate dispersion properties cannot be achieved without the use of kneading technology, and a kneading step is required.

To prevent combustion due to rapid oxidation of ferromagnetic material during kneading, the process is conducted in an oxygen-free environment achieved by means of a nitrogen purge and the like (Japanese Examined Patent Publication (KOKOKU) Heisei No. 7-43819 and Japanese Unexamined Patent Publication (KOKAI)) Heisei No. 11-213379).

To achieve good coating film smoothness, the technique of employing vinyl chloride copolymer having radiation-curing functional groups in a magnetic layer having microgranular magnetic material has been proposed (Japanese Examined Patent Publication (KOKOKU) Heisei Nos. 1-25141 and 5-74621). However, when vinyl chloride copolymer having radiation-curing functional groups is employed, there are problems during the step of kneading in an oxygen-free environment in that radicals are produced by heat from shearing and a radical polymerization reaction sometimes causes the vinyl chloride copolymer to crosslink, resulting in decreased dispersion of the magnetic material and a coating liquid of high viscosity that is unsuitable for coating.

Further, when vinyl chloride copolymer having radiation-curing functional groups is employed in a system with nonmagnetic powder, since kneading can be conducted in air, any radicals that are produced are eliminated by oxygen and no reaction occurs such as that during kneading of ferromagnetic powder. However, in a magnetic recording medium in which an upper magnetic layer is sequentially coated over a nonmagnetic lower layer employing vinyl chloride copolymer having radiation-curing functional groups that has been cured with radiation (Japanese Unexamined Patent Publication (KOKAI) Heisei No. 1-213379), the durability of the magnetic layer is inadequate.

SUMMARY OF THE INVENTION

Accordingly, it is an object of the present invention to provide a magnetic recording medium having excellent coating film smoothness, electromagnetic characteristics and running durability.

The present inventors conducted further studies, resulting in finding that a magnetic recording medium comprising a smooth magnetic layer in which extremely microparticle magnetic material, that is, an acicular magnetic material having a major axis length ranging from 20 to 100 nm is dispersed well and achieving high electromagnetic characteristics and high running durability can be obtained by;

simultaneously multilayer coating a nonmagnetic layer and a magnetic layer, wherein the nonmagnetic layer comprises vinyl chloride copolymer with a molecular weight of 10,000 to 100,000 having a radiation-curing functional group as a binder component, and the magnetic layer does not comprise a binder component comprising a radiation-curing functional group, and employing a certain type irradiation cross-linking cross-linker. Thus, the present invention was achieved.

The present invention relates to a magnetic recording medium comprising a nonmagnetic layer comprising a nonmagnetic powder and a binder and at least one magnetic layer comprising a magnetic material and a binder in this order, wherein said magnetic material is an acicular ferromagnetic material having a major axis length ranging from 20 to 100 nm, said nonmagnetic layer and at least a magnetic layer adjacent to said nonmagnetic layer are obtained by simultaneously multilayer coating a nonmagnetic layer coating liquid and a magnetic layer coating liquid and exposing to radiation, the binder comprised in said nonmagnetic layer coating liquid comprises a vinyl chloride copolymer having a molecular weight ranging from 10,000 to 100,000 and a radiation-curing functional group, said magnetic layer coating liquid does not comprise a binder component having a radiation-curing functional group, said nonmagnetic layer coating liquid and/or said magnetic layer coating liquid comprise a compound having a molecular weight ranging from 200 to 2000 and a radiation-curing functional group with two or more functions, and said magnetic layer adjacent to the nonmagnetic layer has a thickness equal to or less than 0.5 $\mu$m.

DETAILED EXPLANATION OF THE INVENTION

The magnetic recording medium of the present invention is described in detail below.

Conventionally, when a kneading step is employed to disperse extremely microgranular magnetic material in a magnetic layer coating liquid comprising vinyl chloride copolymer having radiation-curing functional groups, there are problems in that the vinyl chloride copolymer is crosslinked by a radical polymerization reaction, thereby decreasing dispersibility of the magnetic material and increasing the viscosity of the coating liquid.

Accordingly, in the present invention, vinyl chloride copolymer having radiation-curing functional groups is employed as binder in the nonmagnetic layer alone. The nonmagnetic layer and at least the magnetic layer adjacent to this nonmagnetic layer are formed by simultaneously multilayer coating a nonmagnetic layer coating liquid and magnetic layer coating liquid, which are then cured by exposure to radiation to obtain a magnetic recording medium having high coating film strength.

Since the magnetic layer of the present invention does not comprise vinyl chloride copolymer having radiation-curing functional groups, radical polymerization of the binder component does not occur during the kneading step. Further, the simultaneous multilayer coating of the nonmagnetic layer and the magnetic layer causes the vinyl chloride copolymer and compounds comprising radiation-curing functional groups in the nonmagnetic layer coating liquid to diffuse into the magnetic layer so that these binder components are essentially also contained in the magnetic layer. Thus, although vinyl chloride copolymer having radiation-curing functional groups is not incorporated into the magnetic layer coating liquid, high-density crosslinking takes place in the magnetic layer, permitting a magnetic layer of high coating film strength.

[Nonmagnetic Layer Binder]

The vinyl chloride copolymer employed as binder in the nonmagnetic layer of the present invention has a molecular weight of 10,000 to 100,000, preferably 20,000 to 70,000, and more preferably 30,000 to 50,000. At a molecular weight of less than 10,000, coating film strength decreases, and at greater than 100,000, solubility in solvent decreases and dispersion properties deteriorate.

The above-mentioned vinyl chloride copolymer comprises radiation-curing functional groups. The presence of radiation-curing functional groups permits high nonmagnetic layer strength, and simultaneous multilayer coating of the nonmagnetic layer and the magnetic layer permits high magnetic layer strength.

The radiation-curing functional groups employed with preference are acryloyl and methacryloyl groups. The content of radiation-curing functional groups in the vinyl chloride copolymer desirably ranges from 50 $\mu$eq/g to 1 meq/g, preferably from 100 to 800 $\mu$eq/g. When the radiation-curing functional group content falls within the above-stated range, high-density crosslinking can be formed, coating film strength can be improved, and running durability can be improved.

The radiation-curing functional groups can be introduced into vinyl chloride copolymer having hydroxyl groups by reacting a known diisocyanate compound such as isocyanate ethyl(meth)acrylate, isocyanate butyl(meth)acrylate, isocyanate propyl(meth)acrylate, tolylenediisocyanate, diphenylmethane diisocyanate, p-phenylene diisocyanate, o-phenylene diisocyanate, m-phenylene diisocyanate, xylylene diisocyanate, or isophorone diisocyanate with an adduct of compounds having radiation-settingcuring functional groups and hydroxyl groups such as 2-hydroxy(meth)acrylate, 2-hydroxyethyl (meth)acrylate, and 2-hydroxypropyl (meth)acrylate. Of these, the incorporation of isocyanate ethyl(meth)acrylate is preferred.

The content in the vinyl chloride copolymer of the repeating unit derived from a vinyl chloride monomer desirably ranges from 60 to 95 weight percent. A content of the repeating unit derived from vinyl chloride monomer equal to or higher than 60 weight percent results in a coating film of high mechanical strength. Such a content equal to or less than 95 weight percent yields high solubility in solvent and good coating film smoothness.

Examples of monomers capable of copolymerization with vinyl chloride monomer that are suitable for use are: aliphatic vinyl esters such as vinyl acetate, vinyl propionate; acrylates and methacrylates such as methyl (meth)acrylate, ethyl (meth)acrylate, butyl (meth)acrylate and benzyl (meth)acrylate; allyl alkyl ethers such as allyl methyl ether, allyl ethyl ether, allyl propyl ether and allyl butyl ether; styrene, $\alpha$-methylstyrene, vinylidene chloride, acrylonitrile, ethylene, butadiene, acrylamide, vinyl alcohol, 2-hydroxyethyl (meth)acrylate, 2-hydroxypropyl (meth) acrylate, polyethyleneglycol (meth)acrylate, polypropyleneglycol (meth)acrylate, hydroxypropylallyl ether, methacrylic acid, maleic acid, maleic anhydride, acrylic acid, glycidyl (meth)acrylate, allyl glycidyl ether, phosphoethyl (meth)acrylate, sulfoethyl (meth)acrylate, p-styrenesulfonic acid, and sodium and potassium salts thereof.

To improve the dispersibility of magnetic and nonmagnetic materials, the above-described vinyl chloride copolymer may have functional groups (polar groups) capable of adsorption onto the surface of these powders. Preferred functional groups suitable for use are: $—SO_3M$, $—SO_4M$, $—PO(OM)_2$, $—OPO(OM)_2$, $>NSO_3M$, $>NRSO_3M$, and $—NR^1R^2$ (where M denotes hydrogen, alkali metal such as Na and K; R denotes an alkylene group; and $R^1$ and $R^2$ each denote an alkyl group, hydroxyalkyl group, or hydrogen). Of these, the use of $—SO_3M$ and $—SO_4M$ is preferred.

[Compounds Comprising Radiation-Curing Functional Groups with Two or More Functions]

The magnetic layer and/or nonmagnetic layer of the present invention comprises a compound having a radiation-curing functional group with two or more functions (referred to hereinafter as a "compound comprising a radiation-curing functional group" or a "radiation-curing compound").

The compound comprising a radiation-curing functional group does not react without energy being supplied by radiation. Thus a coating liquid containing the compound comprising a radiation-curing functional group is of stable viscosity until exposed to radiation, making it possible to achieve high coating film smoothness. Further, since the reaction takes place instantaneously when a high level of energy is supplied by radiation, high crosslinking density is achieved and a coating film of high strength can be achieved. Since the molecular weight is comparatively high, at 200 to 2,000, the coating film easily flows and is readily formed during calendering, yielding a smooth coating film.

Examples of compounds with molecular weights of 200 to 2,000 that comprise radiation-curing functional groups with two or more functions are: acrylic esters, acrylamides, methacrylic esters, methacrylic acid amides, allyl compounds, vinyl ethers, and vinyl esters.

Specific examples of compounds comprising radiation-curing functional groups with two functions are compounds obtained by adding acrylic acid or methacrylic acid to an aliphatic diol, such as: ethyleneglycol diacrylate, propyleneglycol diacrylate, butanediol diacrylate, hexanediol diacrylate, diethyleneglycol diacrylate, triethyleneglycol diacrylate, tetraethyleneglycol diacrylate, neopentylglycol diacrylate, tripropyleneglycol diacrylate, ethyleneglycol dimethacrylate, propyleneglycol dimethacrylate, butanediol dimethacrylate, hexanediol dimethacrylate, diethyleneglycol dimethacrylate, triethyleneglycol dimethacrylate, tetraethyleneglycol dimethacrylate, neopentylglycol dimethacrylate, and tripropyleneglycol dimethacrylate.

Further examples of compounds comprising radiation-curing functional groups with two functions that are suitable for use are; polyether acrylate or polyether methacrylate obtained by adding acrylic acid or methacrylic acid to polyether polyol such as polyethylene glycol, polypropylene glycol or polytetramethylene glycol; polyester acrylate or polyester methacrylate obtained by adding acrylic acid or methacrylic acid to polyester polyol obtained from a known dibasic acid and a glycol. Polyurethane acrylate or polyurethane methacrylate obtained by adding acrylic acid or methacrylic acid to polyurethane obtained by reacting a known polyol or diol with polyisocyanate can also be employed. Compounds with ring structures such as bisphenol A, bisphenol F, hydrogenated bisphenol A, hydrogenated bisphenol F and an adduct of these with alkylene oxide added with acrylic acid or methacrylic acid; isocyanuric alkylene oxide-modified diacrylate; isocyanuric acid alkyleneoxide-modified dimethacrylate; tricyclodecanedimethanol diacrylate, and tricyclodecanedimethanol dimethacrylate may also be employed.

Specific examples of compounds comprising radiation-curing functional groups with three functions that are suitable for use are trimethylolpropane triacrylate, trimethylolethane triacrylate, trimethylolpropane alkyleneoxide-modified triacrylate, pentaerythritol triacrylate, dipentaerythritol triacrylate, isocyanuric acid alkyleneoxide-modified triacrylate, propionic acid dipentaerythritol triacrylate, hydroxypivalic acid-modified trimethylolpropane triacrylate, hydroxypivalic acid-modified trimethylolpropane trimethacrylate, trimethylolpropane trimethacrylate, trimethylolpropane alkyleneoxide-modified trimethacrylate, pentaerythritol trimethacrylate, dipentaerythritol trimethacrylate, isocyanuric acid alkyleneoxide-modified trimethacrylate, and propionic acid dipentaerythritol trimethacrylate.

Specific examples of compounds comprising radiation-curing functional groups with four or more functions that are suitable for use are pentaerythritol tetraacrylate, ditrimethylopropane tetraacrylate, dipentaerythritol pentaacrylate, propionic acid dipentaerythritol tetraacrylate, dipentaerythritol hexaacrylate, and phosphagen alkyleneoxide-modified hexaacrylate.

Among these, the specifically preferred compounds are the acrylate compounds having a molecular weight of 200 to 2,000 and three or more functions. Further preferred are trimethylolpropane triacrylate, pentaerythritol tetraacrylate, dipentaerythritol pentaacrylate, and dipentaerythritol hexaacrylate.

These compounds comprising radiation-curing functional groups may be mixed in any ratio for use. In addition, they may be employed in combination with the known monofunctional acrylate or methacrylate compounds described in "Application Techniques for Low-Energy Electron Beam Irradiation" (2000, published by CMC K.K.) and "UV•EB Curing Techniques" (1982, published by the Sogo Technical Center, K.K.).

The radiation that is employed to crosslink the binder in the present invention can be, for example, an electron beam or ultraviolet radiation. When employing ultraviolet radiation, a photo-polymerization initiator is employed together. Curing with an electron beam is preferred because a polymerization initiator is unnecessary and transmittance depth is considerable.

A scanning, double-scanning, or curtain beam type electron beam accelerator may be employed. However, the curtain beam type is preferred because high output can be achieved at relatively low cost. As regards electron beam characteristics, the accelerating voltage ranges from 30 to 1,000 kV, preferably from 50 to 300 kV. The absorbed dose ranges from 0.5 to 20 Mrad, preferably from 2 to 10 Mrad. At an acceleration voltage of 30 kV or less, energy transmittance is inadequate, and at greater than 300 kV, the efficiency of energy employed in polymerization decreases, which is uneconomical. The atmosphere in which the electron beam is radiated is desirably reduced to an oxygen concentration of 200 ppm or less by means of a nitrogen purge. When the oxygen concentration is high, crosslinking and the curing reaction are blocked near the surface.

A mercury lamp is employed as the ultraviolet radiation source. A mercury lamp providing 20 to 240 W/cm is employed at a speed of 0.3 m/min to 20 m/min. Generally, a distance between the base and the mercury lamp of 1 to 30 cm is preferred.

A photoradical polymerization initiator is employed as the photopolymerization initiator employed for ultraviolet radiation curing. In detail, those described in "New Polymer Experimentology, Vol. 2, Chapter 6, Light and Radiation Polymerization" (Kyoritsu Publishing, released in 1995, ed. by the Polymer Society) can be employed. Specific examples are: acetophenone, benzophenone, anthraquinone, benzoinethylether, benzyl methyl ketal, benzyl ethyl ketal, benzoinisobutylketone, hydroxydimethylphenylketone, 1-hydroxycyclohexylphenylketone, and 2-2-diethoxyacetophenone. The mixing ratio of aromatic ketones suitably ranges from 0.5 to 20 weight parts, preferably from 2 to 15 weight parts, and more preferably from 3 to 10 weight parts per 100 weight parts of compound having radiation-curing functional groups.

Radiation exposure is preferably conducted after the nonmagnetic layer and magnetic layer have been simultaneously multilayer coated, dried, and calendered. Prior to radiation exposure, the magnetic layer is soft and readily flattened by calendering. When the product is rolled up following calendering and stored for an extended period without having been irradiated, irregularities on the back surface sometimes transfer to and roughen the front surface. Accordingly, it is desirable to expose to radiation and cure the magnetic layer (and nonmagnetic layer) as soon as possible following calendering. It is further desirable to conduct the calendaring process and radiation exposure process in an integrated manner.

Known radiation curing devices and conditions, such as those described in "UV•EB Curing Techniques" (published by Sogo Technical Center, K.K.) and "Application Techniques for Low-Energy Electron Beam Irradiation" (2000, published by CMC K.K.) may be employed.

[Binder for Magnetic Layer and Binder Capable for Being Used Together in Nonmagnetic Layer]

In the present invention, binders not comprising a radiation curing functional group can be used as a binder other than the above-mentioned vinyl chloride copolymer in the nonmagnetic layer or a binder in the magnetic layer. Suitable for use as such a binder are: vinyl chloride copolymer, polyurethane resin, polyester resin, polyamide resin, acrylic resins in which styrene, acrylonitrile, methyl methacrylate and the like have been copolymerized, cellulose resins such as nitrocellulose, epoxy resin, phenoxy resin, polyvinylalkyral resins such as polyvinylacetal and polyvinylbutyral; these may be employed singly or multiple resins may be mixed for use. Of these, polyurethane resin and acrylic resins are preferred.

To improve dispersibility of the magnetic and nonmagnetic powders, it is desirable for the binder to have functional groups (polar groups) adsorbing onto the surface of these powders. Preferred functional groups suitable for use are: $-SO_3M$, $-SO_4M$, $-PO(OM)_2$, $-OPO(OM)_2$, $-COOM$, $>NSO_3M$, $>NRSO_3M$, and $-NR^1R^2$, and $-N^+R^1R^2R^3X^-$, and the like. Here, M denotes hydrogen or an alkali metal such as Na and K; R denotes an alkylene group; $R^1$, $R^2$, and $R^3$ each denote an alkyl group, hydroxyalkyl group or hydrogen, and X denotes a halogen such as Cl and Br. The quantity of functional groups in the binder is desirably from 10 to 200 µeq/g, preferably from 30 to 120 µeq/g. At exceeding or below this range, dispersibility tends to decrease. In addition to the above, functional groups comprising active hydrogen such as $-OH$ may also be present.

The weight average molecular weight of the above-mentioned binder desirably ranges from 20,000 to 200,000, preferably from 20,000 to 80,000. At 20,000 or more, coating film strength is high and durability is good, and at 200,000 or less, viscosity is suitable and dispersibility is good; both of these are desirable.

The quantity of binder added desirably ranges from 50 to 300 weight parts, preferably from 100 to 200 weight parts, per 1,000 weight parts of magnetic material in the case of the magnetic layer and the same per 1,000 weight parts of nonmagnetic powder in the case of the nonmagnetic layer. However, in the case of the nonmagnetic layer, the quantity added mentioned above is the total quantity of vinyl chloride copolymer and other binder added. The ratio of vinyl chloride copolymer to other binder suitably falls within a range of 70:30 to 50:50 by weight in consideration of dispersibility of the nonmagnetic powder.

[Magnetic Material]

The ferromagnetic material employed in the magnetic layer of the present invention is acicular ferromagnetic material having a major axis length ranging from 20 to 100 nm. The major axis length preferably ranges from 40 to 90 nm, more preferably from 50 to 80 nm. When the major axis length is less than 20 nm, the saturation magnetization $\sigma$ s becomes inadequate due to thermal fluctuation, and when 100 nm is exceeded, coating film smoothness and electromagnetic characteristics deteriorate, as does coating film strength.

In the present invention, a ferromagnetic alloy powder chiefly comprising $\alpha$-iron is preferred as the acicular magnetic material employed in the magnetic layer. In addition to prescribed atoms, the following atoms can be contained in the ferromagnetic alloy powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, the incorporation of at least one of the following in addition to $\alpha$-iron is desirable: Al, Si, Ca, Y, Ba, La, Nd, Co, Ni and B, further desirably Co, Y, Al. The Co content preferably ranges from 0 to 40 atom percent, more preferably from 15 to 35 atom percent, further preferably from 20 to 35 atom percent. The Y content preferably ranges from 1.5 to 12 atom percent, more preferably from 3 to 10 atom percent, further preferably from 4 to 9 atom percent. The Al content preferably ranges from 5 to 30 atom percent, more preferably from 5 to 15 atom percent, further preferably from 7 to 12 atom percent. These ferromagnetic powders may be pretreated prior to dispersion with dispersing agents, lubricants, surfactants, antistatic agents, and the like, described further below.

Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014.

The ferromagnetic alloy powder may contain a small quantity of hydroxide or oxide. Ferromagnetic alloy powders obtained by known manufacturing methods may be employed. The following are examples: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining micropowder by vaporizing a metal in a low-pressure inert gas. The ferromagnetic alloy powders obtained in this manner may be subjected to any of the known slow oxidation treatments, such as the method of immersion in an organic solvent followed by drying; the method of immersion in an organic solvent followed by formation of an oxide film on the surface by feeding in an oxygen-containing gas, then drying; and the method of forming an oxide film on the surface by adjusting the partial pressure of oxygen gas and a inert gas without using an organic solvent.

The specific surface area by the BET method of the ferromagnetic alloy powder ranges from 45 to 80 $m^2$/g, preferably from 50 to 70 $m^2$/g. Because noise decreases at 45 $m^2$/g or greater and good surface properties can be achieved at 80 $m^2$/g or less, it is preferred. The crystalline size of the ferromagnetic alloy powder ranges from 350 to 80 Å, preferably from 250 to 100 Å, more preferably from 200 to 140 Å. The major axis diameter of the ferromagnetic powder ranges from 10 to 100 nm, preferably from 20 to 90 $\mu$m. The acicular ratio of the ferromagnetic alloy powder preferably ranges from 3 to 15, further preferably from 5 to 12. The $\sigma$ s of the ferromagnetic alloy powder ranges from 100 to 180 A·$m^2$/kg (100 to 180 emu/g), preferably from 110 to 170 A·$m^2$/kg (110 to 170 emu/g), further preferably from 125 to 160 A·$m^2$/kg (125 to 160 emu/g). The coercive force of the ferromagnetic alloy powder preferably ranges from 111 to 279 kA/m (1400 to 3500 Oe), more preferably from 143 to 239 kA/m (1800 to 3000 Oe).

The moisture content of the ferromagnetic alloy powder preferably ranges from 0.01 to 2 percent. The moisture content of the ferromagnetic alloy powder is preferably optimized based on the type of binders. The pH of the ferromagnetic alloy powder is preferably optimized based on the combination with binders employed. The range is from 4 to 12, preferably from 6 to 10. As needed, the surface of the ferromagnetic alloy powder may be treated with Al, Si, P, or oxides thereof, and the like. The quantity thereof ranges from 0.1 to 10 weight percent with respect to the ferromagnetic alloy powder. It is preferable that a surface treatment is applied, because the adsorption of lubricants such as fatty acids becomes equal to or less than 100 mg/$m^2$. Inorganic ions such as soluble Na, Ca, Fe, Ni, Sr, and the like are sometimes incorporated into the ferromagnetic alloy powder. It is basically desirable that these not be present, but characteristics are not particularly affected when the quantity thereof is equal to or less than 200 ppm. Further, there are desirably few pores in the ferromagnetic metal powder employed in the present invention; the level thereof is equal to or less than 20 volume percent, preferably equal to or less than 5 volume percent. The shape may be acicular, rice-particle shaped, or spindle-shaped so long as the above-stated characteristics about particle size are satisfied. A low SFD of the ferromagnetic alloy powder itself is desirable, and 0.8 or less is preferable. It is necessary to narrow the Hc distribution of the ferromagnetic alloy powder. If the SFD is equal to or less than 0.8, the excellent electromagnetic characteristics and high output are achieved and magnetization reversal is sharp and peak shifts are small, which are suited to high density digital magnetic recording. Methods of narrowing the Hc include improving the particle size distribution of the goethite and preventing sintering between particles in the ferromagnetic metal powder.

The magnetic material particle surface can be treated with a dispersion medium or substance suited to the polymer in the course of dispersing the magnetic material. An inorganic compound or organic compound is employed as the surface treatment agent. Representative examples such compounds include oxides or hydroxides of Si, Al, P and the like as well as various silane coupling agents and titanium coupling agents. The quantity added suitably range from 0.1 to 10 percent with respect to a magnetic material.

The pH of the magnetic material is also important to dispersion. A pH ranging from about 4 to 12 is usually optimal for the dispersion medium and polymer, but a pH ranging from about 6 to 10 is selected for the chemical stability and storage properties of the medium. Moisture contained in the magnetic material also affects dispersion. Although there is an optimal value for the dispersion medium and polymer, 0.01 to 2.0 percent is normally selected.

The above-described components are kneaded and dispersed in one of the solvents commonly employed in the preparation of magnetic coating liquid, such as methyl ethyl ketone, dioxane, cyclohexanone, or ethyl acetate, to prepare a magnetic coating material. The kneading and dispersion can be conducted by the usual methods. In addition to the above-described components, abrasives such as $\alpha$-$Al_2O_3$ and $Cr_2O_3$; antistatic agents such as carbon black; lubricants such as fatty acids, fatty esters, and silicone oils; dispersants; and commonly employed additives and fillers can be incorporated into the magnetic coating material.

Carbon black can be added to the magnetic layer of the present invention. Examples of types of carbon black are: furnace black for rubber, thermal for rubber, black for coloring, and acetylene black. A specific surface area of 5 to 500 $m^2$/g, a DBP oil absorption capacity of 10 to 400 mL/100 g, a particle diameter of 5 nm to 300 nm, a pH of 2 to 10, a moisture content of 0.1 to 10 weight percent, and a tap density of 0.1 to 1 g/mL are desirable for the carbon black. Specific examples of types of carbon black employed in the magnetic layer of the present invention are: BLACK PEARLS 2000, 1300, 1000, 900, 800, 700 and VULCAN XC-72 manufactured by Cabot Corporation; #80, #60, #55, #50 and #35 manufactured by Asahi Carbon Co. Ltd.; #2400B, #2300, #900, #1000, #30, #40 and #10B manufactured by Mitsubishi Kasei Kogyo Corp.; and CONDUCTEX SC, RAVEN 150, 50, 40 and 15 manufactured by Columbia Carbon Co. Ltd. The carbon black employed may be surface-treated with a dispersant or the like, or grafted with resin, or have a partially graphite-treated surface. The carbon black may be dispersed in advance into the binder prior to addition to the magnetic coating material. These carbon blacks may be used singly or in combination.

When employing carbon black, the quantity preferably ranges from 0.1 to 30 weight percent with respect to 100 weight parts of the ferromagnetic powder. In the magnetic layer, carbon black works to prevent static buildup, reduce the coefficient of friction, impart light-blocking properties, enhance film strength, and the like; the properties vary with the type of carbon black. Accordingly, it is, as a matter of course, possible for carbon black used in the present invention to properly use varying the kinds, quantity and combination between the magnetic layer and the nonmagnetic layer according to the purpose on the basis of the above-mentioned characteristics, such as particle size, oil absorption capacity, electrical conductivity, and pH. For example, the *Carbon Black Handbook* compiled by the Carbon Black Association may be consulted for types of carbon black suitable for use in the magnetic layer of the present invention.

Abrasives can be added to the magnetic layer. Known materials, chiefly with a Mohs' hardness equal to or higher than 6, such as $\alpha$-alumina having an $\alpha$-conversion rate equal to or higher than 90 percent, $\beta$-alumina, silicon carbide, chromium oxide, cerium oxide, $\alpha$-iron oxide, corundum, artificial diamond, silicon nitride, titanium carbide, titanium oxide, silicon dioxide, and boron nitride, may be used singly or in combination as abrasives. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 weight percent. The particle size of these abrasives may range from 0.01 to 2 $\mu$m, with 0.01 to 0.3 $\mu$m being preferred because of thin magnetic layer. According to the requirement, abrasives of differing particle size may be combined or the same effect may be achieved by broadening the particle diameter distribution even with a single abrasive.

A tap density of 0.3 to 2 g/mL, a moisture content of 0.1 to 5 weight percent, a pH of 2 to 11, and a specific surface area of 1 to 30 $m^2$/g are desirable for the abrasive. The abrasive employed in the present invention may be any of acicular, spherical, or cubic in shape, but shapes that are partially angular have good abrasion properties and are thus preferred.

Specific examples of the abrasives suitable for use in the present invention are: AKP-20, AKP-30, AKP-50, HIT-50 and HIT-100 from Sumitomo Chemical Co., Ltd.; G-5, G-7 and S1 from Nippon Chemical Industrial Co., Ltd.; TF100 and TF-140 from Toda Kogyo Corp. The abrasives employed in the present invention can be properly used varying the kinds, quantity and combination between the magnetic layer and the nonmagnetic layer according to the purpose. These abrasives may be dispersed in advance into the binder prior to addition to the magnetic coating material. In the magnetic recording medium of the present invention, the number of abrasives present at the surface and end surface of the magnetic layer is preferably equal to or higher than 5 pieces/100 $\mu m^2$.

[Nonmagnetic Layer]

The nonmagnetic layer of the present invention will be described below.

A nonmagnetic powder is contained in the nonmagnetic layer of the present invention in addition to the binder. The nonmagnetic powder may be selected from inorganic compounds, examples of which are: metal oxides, metal carbonates, metal sulfates, metal nitrides, metal carbides, metal sulfides and the like. Examples of inorganic compounds are $\alpha$-alumina having an $\alpha$-conversion rate equal to or higher than 90 percent, $\beta$-alumina, $\gamma$-alumina, $\theta$-alumina, silicon carbide, chromium oxide, cerium oxide, $\alpha$-iron oxide, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and $\alpha$-iron oxide. The particle size of these nonmagnetic powders preferably ranges from 0.005 to 2 $\mu$m, but nonmagnetic powders of differing particle size may be combined as needed, or the particle diameter distribution of a single nonmagnetic powder may be broadened to achieve the same effect. What is preferred most is a particle size in the nonmagnetic powder ranging from 0.01 to 0.2 $\mu$m. Particularly when the nonmagnetic powder is a granular metal oxide, a mean particle diameter equal to or less than 0.08 $\mu$m is preferred, and when an acicular metal oxide, a major axis length equal to or less than 0.3 $\mu$m is preferred. The tap density ranges from 0.05 to 2 g/ml, preferably from 0.2 to 1.5 g/ml. The moisture content of the nonmagnetic powder ranges from 0.1 to 5 weight percent, preferably from 0.2 to 3 weight percent, further preferably from 0.3 to 1.5 weight percent. The pH of the nonmagnetic powder ranges from 2 to 11, and the pH between 5.5 to 10 is particular preferred. The specific surface area of the nonmagnetic powder ranges from 1 to 100 $m^2/g$, preferably from 5 to 80 $m^2/g$, further preferably from 10 to 70 $m^2/g$. The crystalline size of the nonmagnetic powder preferably ranges from 0.004 to 1 $\mu$m, further preferably from 0.04 to 0.1 $\mu$m. The oil absorption capacity using dibutyl phthalate (DBP) ranges from 5 to 100 ml/100 g, preferably from 10 to 80 ml/g, further preferably from 20 to 60 ml/100 g. The specific gravity ranges from 1 to 12, preferably from 3 to 6. The shape may be any of acicular, spherical, polyhedral, or plate-shaped.

It is considered that the ignition loss is desirably equal to or less than 20 weight percent, with no loss at all being most preferred. The Mohs' hardness of the above-mentioned nonmagnetic powder employed in the present invention is preferably equal to or higher than 4 and equal to or less than 10. The roughness factor of the powder surface preferably ranges from 0.8 to 1.5, more preferably from 0.9 to 1.2. The stearic acid (SA) adsorption capacity of the nonmagnetic powders ranges from 1 to 20 $\mu$mol/$m^2$, preferably from 2 to 15 $\mu$mol/$m^2$, further preferably from 3 to 8 $\mu$mol/$m^2$. The heat of wetting in 25° C. water of the nonmagnetic powder is preferably within the range of $2\times10^{-5}$ to $6\times10^{-5}$ J/$cm^2$ (200 to 600 erg/$cm^2$). A solvent with a heat of wetting within this range may also be employed. The pH between 3 to 6 is preferred. The content of water-soluble Na of the nonmagnetic powder ranges from 0 to 150 ppm and that of water-soluble Ca ranges from 0 to 50 ppm.

The surface of these nonmagnetic powders is preferably treated with $Al_2O_3$, $SiO_2$, $TiO_2$, $ZrO_2$, $SnO_2$, $Sb_2O_3$, ZnO and $Y_2O_3$. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the nonmagnetic layer of the present invention are: Nanotite from Showa Denko K. K.; HIT-100 and ZA-G1 from Sumitomo Chemical Co., Ltd.; α-hematite DPN-250, DPN-250BX, DPN-245, DPN-270BX, DBN-SA1 and DBN-SA3 from Toda Kogyo Corp.; titanium oxide TTO-51B, TTO-55A, TTO-55B, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; and sintered products of the same. Particular preferable nonmagnetic powders are titanium dioxide and α-iron oxide.

Mixing carbon black into the nonmagnetic layer achieves the known effects of lowering surface resistivity Rs and reducing light transmittance, as well as yielding the desired micro Vickers hardness. Further, the incorporation of carbon black into the nonmagnetic layer can also serve to store lubricants. Examples of types of carbon black that are suitable for use are furnace black for rubber, thermal for rubber, black for coloring and acetylene black. Based on the effect desired, the following characteristics can be optimized in the carbon black in the nonmagnetic layer, and effects can be achieved by using different carbon blacks in combination.

The specific surface area of carbon black employed in the nonmagnetic layer ranges from 100 to 500 $m^2/g$, preferably from 150 to 400 $m^2/g$ and the DBP oil absorption capacity ranges from 20 to 400 ml/100 g, preferably from 30 to 200 ml/100 g. The particle diameter of carbon black ranges from 5 to 80 nm, preferably from 10 to 50 nm, further preferably from 10 to 40 nm. It is preferable for carbon black that the pH ranges from 2 to 10, the moisture content ranges from 0.1 to 10% and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000 and #4010 from Mitsubishi Chemical Corporation; CONDUC-TEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 weight percent with respect to the inorganic powder above and does not exceed 40 percent with respect to the total weight of the nonmagnetic layer. These types of carbon black may be employed singly or in combination. The *Carbon Black Handbook* compiled by the Carbon Black Association may be consulted for types of carbon black suitable for use in the present invention.

Based on the objective, an organic powder may be added to the nonmagnetic layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

In the present invention, known additives can be added to both of the magnetic layer and nonmagnetic layer. Substances having lubricating effects, antistatic effects, dispersive effects, plasticizing effects, or the like may be employed as additives. Examples are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having 10 to 24 carbon atoms (which may contain an unsaturated bond or may be branched) and metal (e.g., Li, Na, K, Cu) salts thereof; monohydric, dihydric, trihydric, tetrahydric, pentahydric and hexahydric alcohols having 12 to 22 carbon atoms (which may contain an unsaturated bond or be branched); alkoxy alcohols having 12 to 22 carbon atoms;

monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty esters of monoalkyl ethers of alkylene oxide polymers; fatty acid amides having 8 to 22 carbon atoms; aliphatic amines having 8 to 22 carbon atoms; and the like.

Specific examples of the above compounds are: lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines.

Details of these surfactants are described in *Surfactants Handbook* (published by Sangyo Tosho Co., Ltd.). These lubricants, antistatic agents and the like need not be 100 percent pure and may contain impurities, such as isomers, unreacted material, by-products, decomposition products, and oxides in addition to the main components. These impurities preferably comprise equal to or less than 30 weight percent, and more preferably equal to or less than 10 percent.

The lubricants and surfactants employed in the present invention may be employed differently in the magnetic layer and nonmagnetic layer as needed based on type and quantity. For example, it is conceivable to control bleeding onto the surface through the use in the magnetic layer and the nonmagnetic layer of fatty acids having different melting points, to control bleeding onto the surface through the use of esters having different boiling points and polarities, to improve coating stability by adjusting the amount of surfactant, and to enhance the lubricating effect by increasing the amount of lubricant added to the nonmagnetic layer; this is not limited to the examples given here. All or some of the additives used in the present invention may be added at any stage in the process of manufacturing the magnetic coating liquid. For example, they may be mixed with the ferromagnetic powder before a kneading step; added during a step of kneading the ferromagnetic powder, the binder, and the solvent; added during a dispersing step; added after dispersing; or added immediately before coating. Depending on the objective, part or all of the additives may be applied by simultaneous or sequential coating after the magnetic layer has been applied to achieve a specific purpose. Depending on the objective, the lubricant may be coated on the surface of the magnetic layer after calendering or making slits.

Examples of the trade names of lubricants suitable for use in the present invention are: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid, manufactured by NOF Corporation; oleic acid, manufactured Kanto Chemical Co.Ltd; FAL-205 and FAL-123, manufactured by Takemoto Oil & Fat Co., Ltd.; NJLUB LO, NJLUB IPM, and Sansosyzer E4030, manufactured by New Japan Chemical Co.Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935, manufactured by Shin-Etsu Chemical Co.Ltd.; Armide P, Armide C and Armoslip CP, manufactured by Lion Armour Co., Ltd.; Duomine TDO, manufactured by Lion Corporation; BA-41G, manufactured by Nisshin Oil Mills, Ltd.; and Profan 2012E, Newpole PE61, Ionet MS-400, Ionet MO-200, Ionet DL-200, Ionet DS-300, Ionet DS-1000 and Ionet DO-200, manufactured by Sanyo Chemical Industries, Ltd.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the magnetic layer solvent composition be not less than the arithmetic mean value of the nonmagnetic layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably from 8 to 11.

[Nonmagnetic Support]

Nonmagnetic supports suitable for use in the present invention include known supports such as biaxially oriented polyethylene napthalate, polyethylene terephthalate, polyamide, polyimide, polyamidoimide, aromatic polyamide, and polybenzoxidazole. Polyethylene naphthalate and aromatic polyimide are preferred. These nonmagnetic supports may be in advance subjected to corona discharge, plasma treatment, adhesion-enhancing treatment, heat treatment, or the like. It is further desirable for a nonmagnetic support suitable for use in the present invention to have a surface with good smoothness in the form of a centerline average surface roughness falling within a range of 0.1 to 20 nm, preferably 1 to 10 nm, at a cutoff value of 0.25 mm. It is further desirable for these nonmagnetic supports to have not only a low centerline average surface roughness, but also to have no rough protrusions of 1 $\mu$m or greater.

[Layer Structure]

In the thickness structure of the magnetic recording medium of the present invention, the nonmagnetic support suitably has a thickness of 1 to 100 $\mu$m, preferably 4 to 80 $\mu$m. The thickness of the magnetic layer is desirably equal to or less than 0.5 $\mu$m, preferably 0.01 to 0.5 $\mu$m, and more preferably 0.05 to 0.2 $\mu$m. When excessively thick, the surface roughens and electromagnetic characteristics deteriorate. However, when the magnetic layer is excessively thin, it becomes impossible to form a uniform recording layer; thus, a thickness equal to or higher than 0.01 $\mu$m is desirable. The thickness of the nonmagnetic layer desirably ranges from 0.5 to 3 $\mu$m, preferably from 0.8 to 2 $\mu$m. When excessively thin, durability decreases, and when excessively thick, the surface roughens and electromagnetic characteristics deteriorate. The combined thickness of the magnetic layer and the nonmagnetic layer suitably falls within a range of $1/100^{th}$ to twice the thickness of the nonmagnetic support.

Further, an undercoat layer may be provided between the nonmagnetic support and the nonmagnetic layer to enhance adhesion. The thickness of this undercoat layer ranges from 0.01 to 2 $\mu$m, preferably from 0.02 to 0.5 $\mu$m.

Further, a backcoat layer may be provided on the side of the nonmagnetic support employed on the present invention on which the nonmagnetic coating material is not applied. The usual backcoat layer is a layer provided by coating a backcoat layer forming coating material obtained by dispersing granular components such as antistatic agents and a binder in an organic solvent. An adhesive layer may be provided on the coating surfaces of the nonmagnetic coating material on the nonmagnetic support and the backcoat layer forming coating material. When a backcoat layer is provided on the nonmagnetic support on the reverse side from the nonmagnetic layer, the thickness of the backcoat layer suitably ranges from 0.1 to 2 $\mu$m, preferably from 0.3 to 1.0 $\mu$m. Known undercoat layers and backcoat layers may be employed.

[Manufacturing Method]

As an example of the method of manufacturing the magnetic recording medium of the present invention, a nonmagnetic layer coating liquid and at least the coating liquid of the magnetic layer adjacent to the nonmagnetic layer are simultaneously multilayer coated on the surface of the nonmagnetic support while running. Conducting simultaneous multilayer coating diffuses the compound having radiation-curing functional groups that is the binder component contained in the nonmagnetic layer, and in some cases, the vinyl chloride copolymer, into the magnetic layer, essentially incorporating these components into the magnetic layer. Thus, it is possible to achieve a high degree of crosslinking of the magnetic layer and increase the strength of the magnetic layer. When multiple magnetic layers are employed, multiple magnetic layer coating liquids that are not adjacent to the nonmagnetic layer may be sequentially or simultaneously multilayer coated.

Coating machines suitable for use in applying the magnetic coating material mentioned above are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center (K.K.) may be referred to in this regard.

The following are examples of methods suitable for use when coating a magnetic layer and a nonmagnetic layer of the present invention:

1. The upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei Nos. 2-17971 and 2-265672.

2. The upper and lower layers are applied nearly simultaneously using an extrusion coating apparatus with a backup roller as disclosed in Japanese Unexamined Patent Publication (KOKAI) Heisei No. 2-174965.

The coating layer of the magnetic coating material that has been applied is dried after subjecting the ferromagnetic powder contained in the coating layer of the magnetic coating material to magnetic orientation. After drying in this manner, the coating layer is processed for surface smoothness. For example, super calender rolls or the like are employed in the surface smoothness treatment. Processing the surface for smoothness eliminates voids generated by elimination of the solvent during drying and increases the fill rate of ferromagnetic powder in the magnetic layer, yielding a magnetic recording medium with good electromagnetic characteristics. The calendering rolls employed are heat-resistant plastic rolls of epoxy, polyimide, polyamide, or polyamidoimide. Processing may also be conducted with metal rolls.

The magnetic recording medium of the present invention desirably has a surface with extremely good smoothness in the form of a centerline average surface roughness of 0.1 to 4 nm, preferably 1 to 3 nm, at a cutoff value of 0.25 mm. A surface with such high smoothness can be achieved by selecting specific ferromagnetic powders and binders such as those set forth above, forming a magnetic layer, and calendering it as set forth above. Calendering is preferably conducted under the condition of a calender temperature of 60 to 100° C., preferably 70 to 100° C., and still more preferably 80 to 100° C., and a pressure of 9.8 to 49 MPa (100 to 500 kg/cm$^2$), preferably 19.6 to 44.1 MPa (200 to 450 kg/cm$^2$), and more preferably 29.4 to 39.2 MPa (300 to 400 kg/cm$^2$). As set forth above, radiation exposure is desirably conducted after application of the nonmagnetic and magnetic layers, drying, and calendering. The laminate obtained by curing in this manner may be cut to desired shape either directly or following further layer formation.

Embodiments

Embodiments of the present invention are given below by way of describing the present invention in greater detail. The "parts" referred to below are "weight parts".

(1) EMBODIMENTS 1–6, COMPARATIVE EXAMPLES 1–3 and 5–7

Simultaneous Multilayer Coating
Preparation of Magnetic Layer Coating Liquid 100 parts of ferromagnetic alloy powder (composition: Fe 89 atm %, Co 5 atm %, Y 6 atm %; Hc 159 kA/m (2,000 Oe), crystalline size 15 nm, BET specific surface area 59 m$^2$/g, major axis diameter 75 nm, acicular ratio 7, σs 150 A·m²/kg (150 emu/g)) were comminuted for 10 min in an open kneader substituted by nitrogen gas to an oxygen concentration equal to or less than 3 percent. Next, 20 parts (solid component) of the vinyl chloride copolymer resin solution shown in Table 1 and 60 parts of cyclohexanone were kneaded for 60 min. Next,

| | |
|---|---|
| Abrasive (Al₂O₃, particle size 0.3 μm) | 2 parts |
| Carbon black (particle size 40 μm) | 2 parts |
| Methyl ethyl ketone/toluene = 1/1 were added and dispersed for 120 min in a sandmill. To this, | 200 parts |
| The radiation-curing compounds shown in Table 1 | 5 parts (solid component) |
| Butyl stearate | 2 parts |
| Stearic acid | 1 part |
| Methyl ethyl ketone | 50 parts | were added and mixed by stirring for another 20 min. Subsequently, the mixture was passed through a filter having a mean pore diameter of 1 μm to prepare a magnetic layer coating liquid.

Preparation of Nonmagnetic Layer Coating Liquid 85 parts of α-Fe₂O₃ (average particle size 0.15 μm, $S_{BET}$ 52 m²/g, surface treatment Al₂O₃, SiO₂, pH 6.5–8.0) were comminuted for 10 min in an open kneader, kneaded for 60 min with 10 parts of the vinyl chloride copolymer shown in Table 1, 5 parts (solid component) of SO₃Na-comprising polyurethane solution, and 60 parts of cyclohexanone. Next,

| | |
|---|---|
| Methyl ethyl ketone/cyclohexanone = 6/4 were added and the mixture was dispersed for 120 min in a sandmill. To this, | 200 parts |
| Radiation-curing compound shown in Table 1 | 15 parts (solid component) |
| Butyl stearate | 2 parts |
| Stearic acid | 1 part |
| Methyl ethyl ketone | 50 parts | were added and mixed by stirring for another 20 min and passed through a filter having a mean pore diameter of 1 μm to prepare a nonmagnetic layer coating liquid.

Next, an adhesive layer in the form of polyester resin comprising sulfonic acid was applied with a coil bar in a quantity yielding a dry thickness of 0.1 μm on the surface of an aramide support 10 μm in thickness.

Next, the nonmagnetic layer coating liquid was applied so as to yield the dry film thickness given in Table 1, and immediately thereafter, the magnetic layer coating liquid was simultaneously multilayer coated with a reverse roll. While the magnetic layer coating liquid was still wet, magnetic orientation was conducted with a 0.5 T (5,000 Gauss) Co magnet and a 0.4 T (4,000 Gauss) solenoid magnet, and the coated product was calendered with a metal roll—metal roll—metal roll—metal roll—metal roll—metal roll—metal roll combination (speed 100 m/min, linear pressure 300 kg/cm, temperature 90° C.). The magnetic layer surface of the tape obtained was irradiated with an electron beam at an acceleration voltage of 175 kV and a beam current of 10 mA to generate an absorption dose of 10 Mrad. The tape was then slit to a width of 3.8 mm.

Based on the above-described method, the ferromagnetic powders having a major axis length given in Table 1, vinyl chloride copolymers, and radiation-curing compounds were used to prepare Embodiments 2–6 and Comparative Examples 1–3 and 5–7.

(2) COMPARATIVE EXAMPLE 4

Sequential Multilayer Coating

The same magnetic layer coating liquid and nonmagnetic layer coating liquid were employed as in Embodiment 1.

An adhesive layer in the form of a polyester resin comprising sulfonic acid was applied on the surface of an aramide support 10 μm in thickness using a coil bar to yield a dry thickness of 0.1 μm.

Next, a nonmagnetic layer coating liquid was applied to yield the dry film thickness given in Table 1 and irradiated with an electron beam at an acceleration voltage of 175 kV and a beam current of 3 mA to generate an absorption dose of 3 Mrad. A magnetic layer coating liquid was sequentially multilayer coated over the nonmagnetic layer obtained to yield the dry thickness given in Table 1 using a reverse roll. While the magnetic layer coating liquid was still wet, magnetic orientation was conducted with a 0.5 T (5,000 Gauss) Co magnet and a 0.4 T (4,000 Gauss) solenoid magnet and the coated product was calendered with a metal roll—metal roll—metal roll—metal roll—metal roll—metal roll—metal roll combination (speed 100 m/min, linear pressure 300 kg/cm, temperature 90° C.). The magnetic layer surface of the tape obtained was irradiated with an electron beam at an acceleration voltage of 175 kV and a beam current of 10 mA to generate an absorption dose of 10 Mrad. The tape was then slit to a width of 3.8 mm.

The physical properties of the tape obtained are given in Table 1.

Measurement Methods (1) Coating Film Smoothness

The Coating film smoothness indicates the relative value, where the number of protrusions of 10 nm or greater in Comparative Example 1 is defined as 100 when scanned with a tunnel current of 10 nA and a bias current of 400 mV over a range of 30×30 μm using a Nanoscope II made by Digital Instruments.

(2) SQ

These values were measured with a vibrating sample magnetometer (made by Toei Kogyo) at an external magnetic field intensity of 3.98×10⁵ A/m.

(3) Electromagnetic Characteristics

The reproduction output of a recording of a 4.7 MHz single-frequency signal made at optimum recording current on a DDS3 drive was measured.

(4) Coating Film Durability

In a 50° C., 20 percent RH environment, the magnetic layer surface was contacted with the guidepoles employed in a DDS3 drive to generate a load of 10 g (T1). This was repeated for 1,000 passes at a speed of 8 mm/sec. The magnetic layer surface was observed by differential interference optical microscopy and evaluated on the following scale:

| | |
|---|---|
| Excellent: | Complete absence of rub marks |
| Good: | Slight rub marks observed |
| Poor: | Rub marks observed and magnetic layer shaved |

TABLE 1

| | Binder component in magnetic layer | | Binder component in nonmagnetic layer | | Major axis length of ferromagnetic powder (nm) | Coating method | Thickness of coating magnetic layer/ nonmagnetic layer (μm) | (1) Relative value of coating smoothness | (2) SQ | (3) Electromagnetic characteristics dB | (4) Coating film durability |
|---|---|---|---|---|---|---|---|---|---|---|---|
| | Vinyl chloride copolymer | Radiation-curing compound | Vinyl chloride cipolymer | Radiation-curing compound | | | | | | | |
| Embodiment 1 | A | C | B | C | 75 | Si/M* | 0.1/1.0 | 74 | 0.90 | 1.2 | Excellent |
| Embodiment 2 | A | D | B | D | 75 | Si/M* | 0.1/1.0 | 77 | 0.89 | 1.1 | Excellent |
| Embodiment 3 | A | — | B | C | 75 | Si/M* | 0.1/1.0 | 78 | 0.90 | 0.8 | Excellent |
| Embodiment 4 | A | C | B | C | 60 | Si/M* | 0.1/1.0 | 70 | 0.90 | 1.2 | Excellent |
| Embodiment 5 | A | C | B | C | 75 | Si/M* | 0.5/1.0 | 89 | 0.89 | 0.9 | Excellent |
| Embodiment 6 | A | C | B | — | 75 | Si/M* | 0.1/1.0 | 78 | 0.89 | 1.1 | Excellent |
| Comp. Ex. 1 | A | C | A | C | 75 | Si/M* | 0.1/1.0 | 100 | 0.84 | 0.0 | Poor |
| Comp. Ex. 2 | B | C | B | C | 76 | Si/M* | 0.1/1.0 | 135 | 0.78 | -2.7 | Good |
| Comp. Ex. 3 | B | D | C | D | 75 | Si/M* | 0.1/1.0 | 130 | 0.80 | -2.5 | Good |
| Comp. Ex. 4 | A | C | B | C | 75 | Se/M** | 0.1/1.0 | 110 | 0.85 | -0.5 | Poor |
| Comp. Ex. 5 | B | C | B | C | 60 | Si/M* | 0.1/1.0 | 130 | 0.77 | -2.3 | Good |
| Comp. Ex. 6 | A | C | B | C | 75 | Si/M* | 1.0/1.0 | 105 | 0.86 | -0.3 | Poor |
| Comp. Ex. 7 | A | C | B | C | 120 | Si/M* | 0.1/1.0 | 110 | 0.84 | -0.5 | Poor |

Vinyl chloride copolymer A: Weight average molecular weight 25,000, $SO_3K$ content $1 \times 10^{-4}$ eq/g, Epoxy group content $7 \times 10^{-4}$ eq/g, Hyrdroxyl group content $3 \times 10^{-4}$ eq/g
Vinyl chloride copolymer B: Vinyl chloride copolymer having a radiation-curing functional group (weight average molecular weight 26,000)
Radiation-curing compound C: pentaerythritol tetraacrylate (molecular weight 352)
Radiation-curing compound D: dipentaerythritol hexaacrylate (molecular weight 593)
*Si/M means simultaneously multilayer coating.
**Se/M means sequentially multilayer coating.

Evaluation Results

Embodiments 1, 2, 4 and 5 are examples in which a vinyl chloride copolymer A not comprising radiation-curing functional groups was employed as binder in the magnetic layer, vinyl chloride copolymer B comprising radiation-curing functional groups was employed in the nonmagnetic layer, radiation-curing compounds C and D were incorporated into both layers, and the nonmagnetic layer and magnetic layer were simultaneously multilayer coated. In each of these embodiments, coating film smoothness was good, electromagnetic characteristics were good, and the SQ was high. This was attributed to the use of microgranular magnetic material, the application of a thin magnetic layer, and good dispersibility of the magnetic material despite the use of microgranular magnetic material. Coating film durability was also good. It was further thought that simultaneous multilayer coating resulted in the diffusion of nonmagnetic layer binder components into the magnetic layer which then formed high-density crosslinking and improved the strength of the coating film.

Embodiment 3 is an example prepared in the same manner as Embodiment 1, with the exception that no radiation-curing compound was incorporated into the magnetic layer. Embodiment 6 is an example prepared in the same manner as Embodiment 1, with the exception that no radiation-curing compound was incorporated into the nonmagnetic layer. Both embodiments had high coating film smoothness and good electromagnetic characteristics. Further, the SQ was high and durability was good.

Comparative Example 1 is an example prepared in the same manner as Embodiment 1, with the exception that vinyl chloride copolymer A not comprising radiation-curing functional groups was used in place of vinyl chloride copolymer B having radiation-curing functional groups in the nonmagnetic layer. Relative to the embodiments, this comparative example had poor coating film smoothness and electromagnetic characteristics. The SQ was also low and coating film durability was poor. This was attributed to vinyl chloride copolymer having radiation-curing functional groups not being employed in the nonmagnetic layer, with the result that the effect of improved coating film strength due to crosslinking was not achieved in either the magnetic layer or nonmagnetic layer.

Comparative Example 2 is an example prepared in the same manner as Embodiment 1, with the exception that vinyl chloride copolymer B having radiation-curing functional groups was employed in the magnetic layer. Comparative Example 3 is an example prepared in the same manner as Embodiment 2, with the exception that vinyl chloride copolymer B having radiation-curing functional groups was employed in the magnetic layer. Comparative Example 5 is an example prepared in the same manner as Embodiment 4, with the exception that vinyl chloride copolymer B comprising radiation-curing functional groups was employed in the magnetic layer. All of these comparative examples had poor coating film smoothness, magnetic characteristics, and SQ relative to the embodiments. This was attributed to vinyl chloride copolymer B comprising radiation-curing functional groups undergoing radical polymerization during kneading of the magnetic layer coating liquid. Further, since an adequate crosslinking effect was not achieved, coating film durability was poor relative to the embodiments.

Comparative Example 4 is an example in which the same magnetic layer coating liquid and nonmagnetic layer coating liquid as in Embodiment 1 were sequentially, not simultaneously, multilayer coated. Coating film smoothness, electromagnetic characteristics, SQ, and coating film durability were all poor relative to the embodiments. This was attributed to the impossibility of achieving the effect of diffusion of nonmagnetic layer binder components in sequential multilayer coating.

Comparative Example 6 is an example prepared in the same manner as in Embodiment 1, with the exception that the magnetic layer thickness exceeded the range of the present invention (1.0 μm). A thick magnetic layer resulted in poor coating film smoothness, electromagnetic characteristics, SQ, and coating film durability relative to the embodiments.

Comparative Example 7 is an example prepared in the same manner as in Embodiment 1, with the exception that the major axis length of the ferromagnetic powder comprised in the magnetic layer exceeded the range of the present invention (120 nm). The large magnetic material size resulted in poor coating film smoothness, electromagnetic characteristics, SQ, and coating film durability relative to the embodiments.

Due to the high coating film smoothness of the magnetic recording medium of the present invention, good electromagnetic characteristics can be achieved. Further, coating film damage with repeated running is reduced and coating durability is improved. In the magnetic recording medium of the present invention, although vinyl chloride copolymer comprising radiation-curing functional groups and a compound having radiation-curing functional groups with two or more functions are employed, high-density crosslinking is achieved without reduction in crosslinking density due to radical polymerization, achieving good durability in high-temperature environments.

The present disclosure relates to the subject matter contained in Japanese Patent Application No. 2001-152785 filed on May 22, 2001, which is expressly incorporated herein by reference in its entirety.

What is claimed is:

1. A magnetic recording medium comprising a nonmagnetic layer comprising a nonmagnetic powder and a binder and at least one magnetic layer comprising a magnetic material and a binder in this order, wherein said magnetic material is an acicular ferromagnetic material having a major axis length ranging from 20 to 100 nm, said nonmagnetic layer and at least a magnetic layer adjacent to said nonmagnetic layer are obtained by simultaneously multilayer coating a nonmagnetic layer coating liquid and a magnetic layer coating liquid and exposing to radiation, the binder comprised in said nonmagnetic layer coating liquid comprises a vinyl chloride copolymer having a weight-average molecular weight ranging from 10,000 to 100,000 and a radiation-curing functional group, said magnetic layer coating liquid does not comprise a binder component having a radiation-curing functional group, said nonmagnetic layer coating liquid and/or said magnetic layer coating liquid comprise a compound having a molecular weight ranging from 200 to 2000 and a radiation-curing functional group with two or more functions, and said magnetic layer adjacent to the nonmagnetic layer has a thickness equal to or less than 0.5 $\mu$m.

2. The magnetic recording medium according to claim 1, wherein said vinyl chloride copolymer has a weight-average molecular weight of 20,000 to 70,000.

3. The magnetic recording medium according to claim 1, wherein said vinyl chloride copolymer has a weight-average molecular weight of 30,000 to 50,000.

4. The magnetic recording medium according to claim 1, wherein said radiation-curing functional group in said vinyl chloride copolymer is selected from the group of acryloyl and methacryloyl groups.

5. The magnetic recording medium according to claim 1, wherein content of radiation-curing functional groups in said vinyl chloride copolymer ranges from 50 $\mu$eq/g to 1 meq/g.

6. The magnetic recording medium according to claim 5, wherein said content ranges from 100 to 800 $\mu$eq/g.

7. The magnetic recording medium according to claim 1, wherein content of repeating unit derived from a vinyl chloride monomer in said vinyl chloride copolymer ranges from 60 to 95 weight percent.

8. The magnetic recording medium according to claim 1, wherein said compound having a molecular weight ranging from 200 to 2000 and a radiation-curing functional group with two or more functions is an acrylate compound having a molecular weight of 200 to 2,000 and three or more functions.

9. The magnetic recording medium according to claim 8, wherein said acrylate compound is selected from the group consisting of trimethylolpropane triacrylate, pentaerythritol tetraacrylate, dipentaerythritol pentaacrylate, and dipentaerythritol hexaacrylate.

10. The magnetic recording medium according to claim 1, wherein said acicular ferromagnetic material has a major axis length ranging from 40 to 90 nm.

11. The magnetic recording medium according to claim 1, wherein said acicular ferromagnetic material has a major axis length ranging from 50 to 80 nm.

12. The magnetic recording medium according to claim 1, wherein said radiation is an electron beam or ultraviolet radiation.

13. The magnetic recording medium according to claim 1, wherein said radiation is a ultraviolet radiation and said nonmagnetic layer coating liquid comprises a photopolymerization initiator.

* * * * *